July 29, 1924.　　　　　W. I. WHEELER　　　　　1,503,405
SAFETY DEVICE FOR VEHICLES
Filed Jan. 7, 1922　　　3 Sheets-Sheet 1
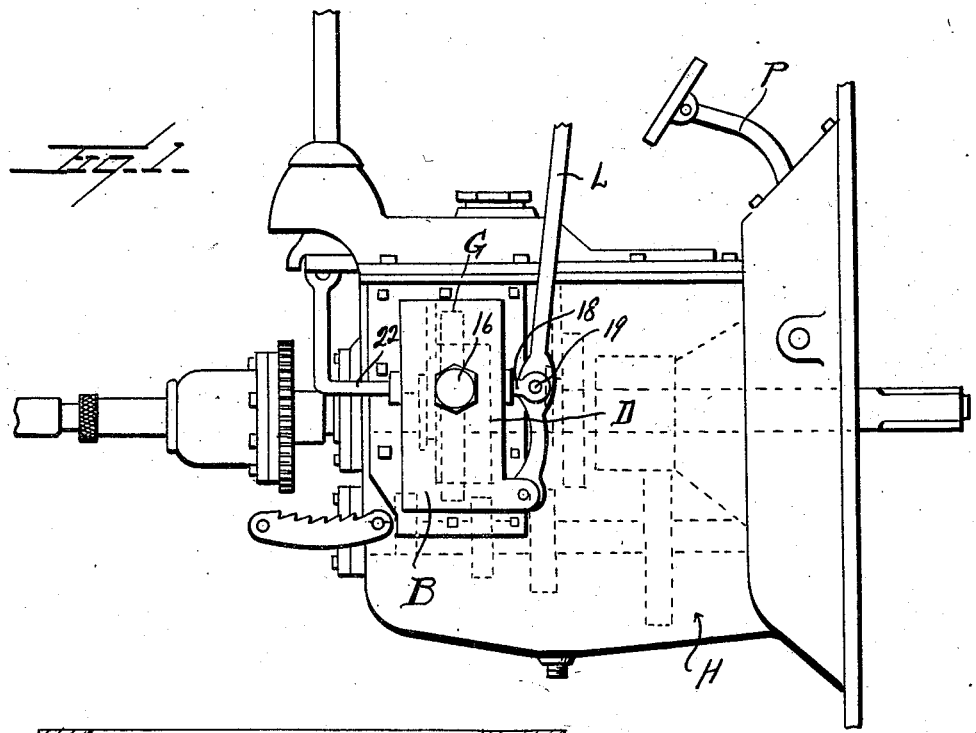
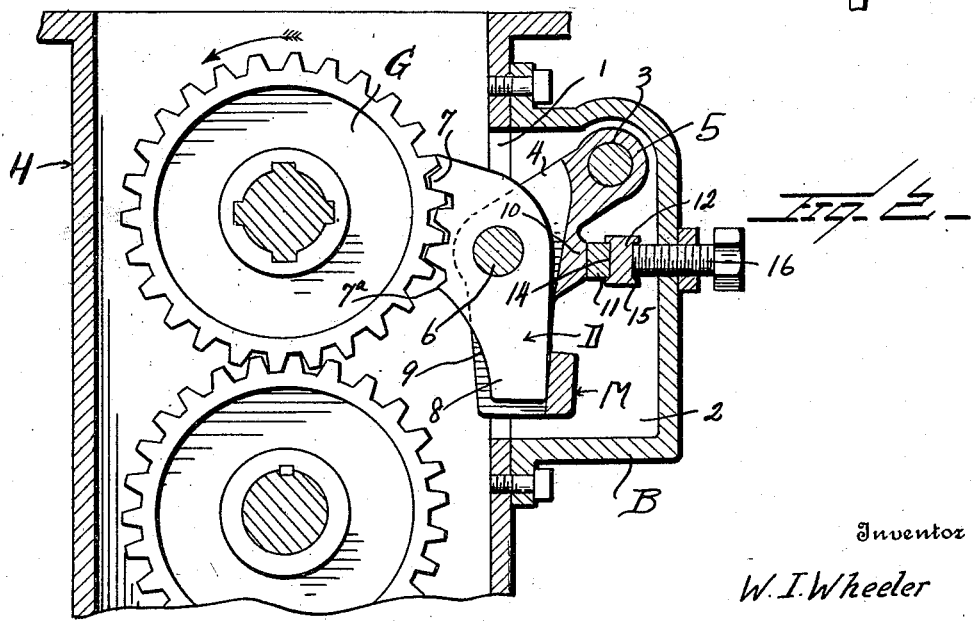
Inventor
W. I. Wheeler
By Watson E. Coleman
Attorney July 29, 1924.
W. I. WHEELER
SAFETY DEVICE FOR VEHICLES
Filed Jan. 7, 1922
1,503,405
3 Sheets-Sheet 2
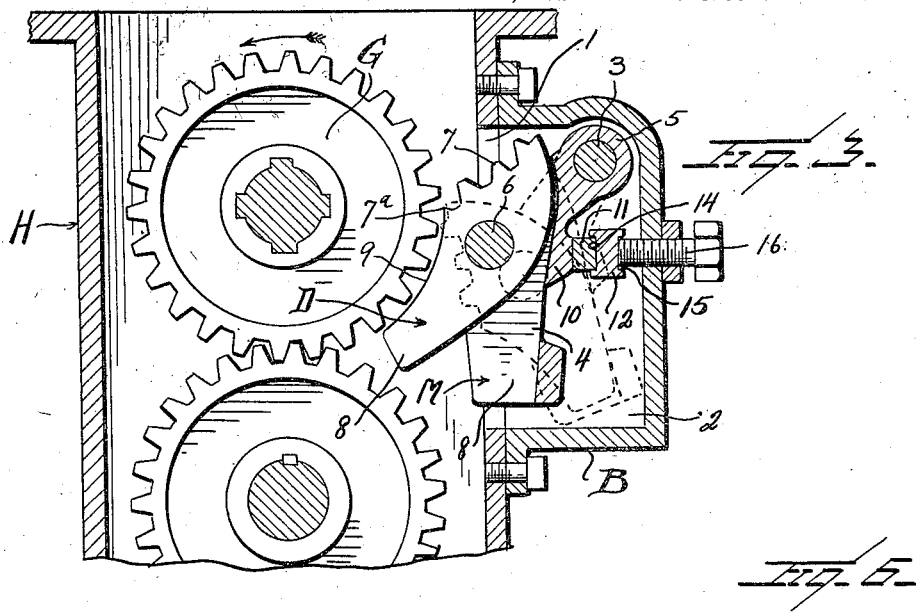
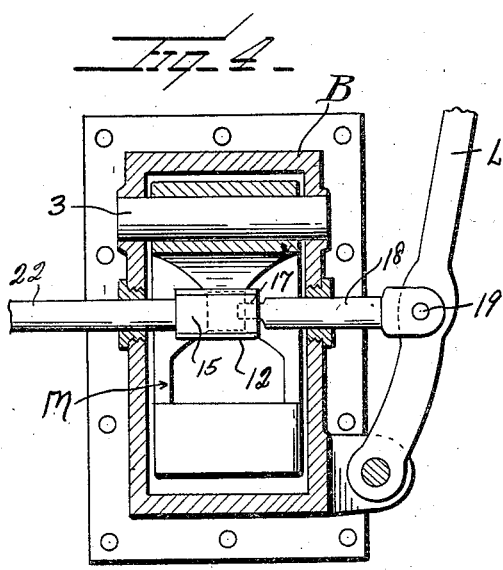
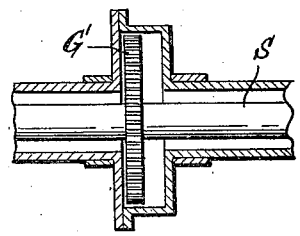
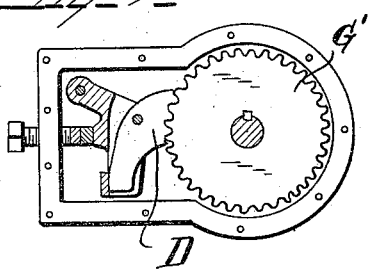
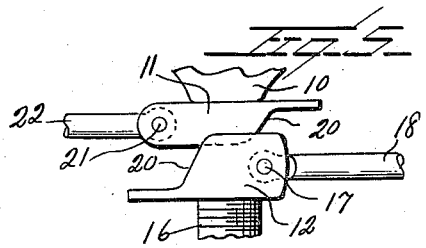
Inventor
W. I. Wheeler
By Watson E. Coleman
Attorney

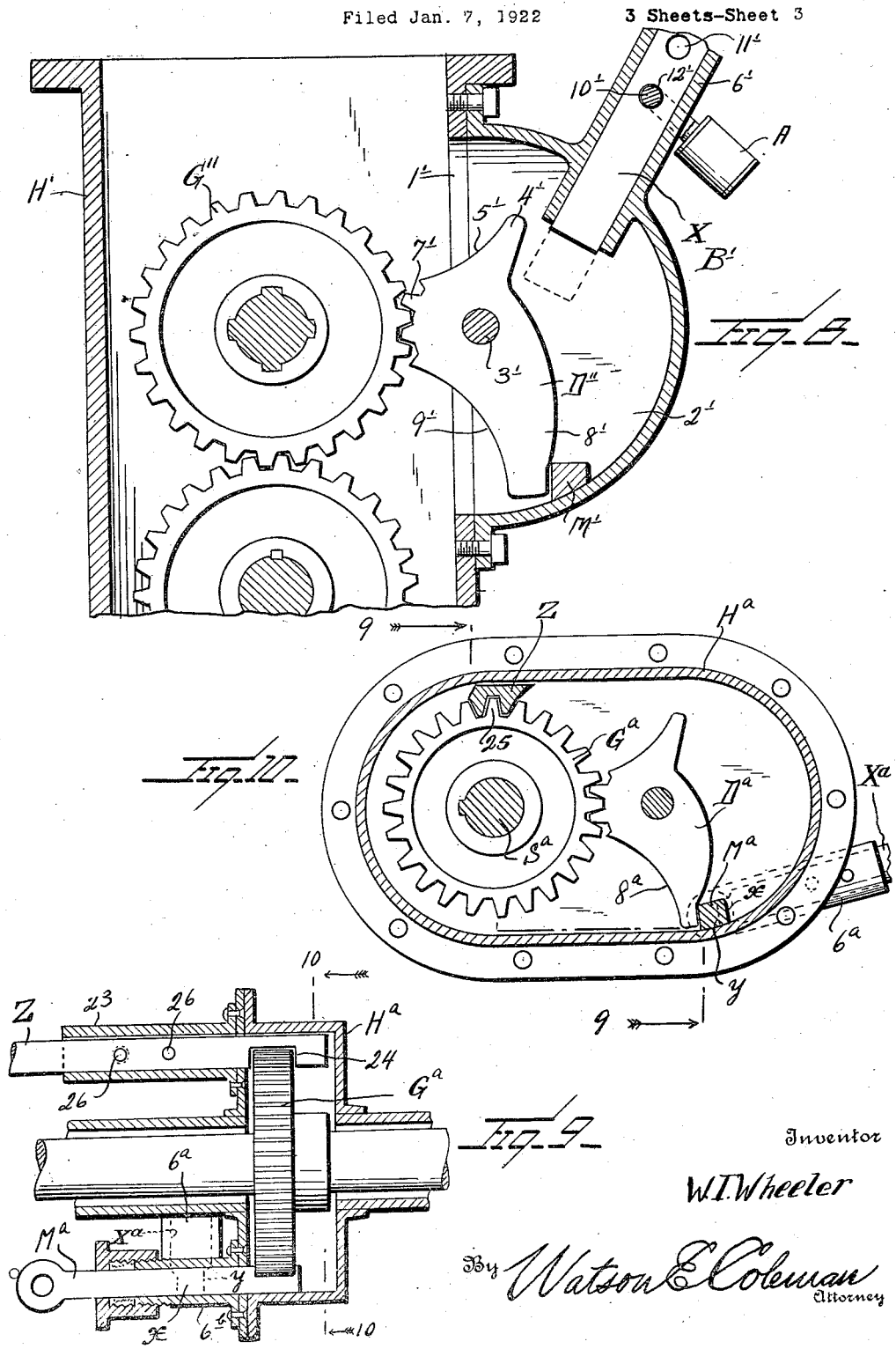

Patented July 29, 1924.

1,503,405

UNITED STATES PATENT OFFICE.

WILLIAM ISIAH WHEELER, OF SCOTTVILLE, ILLINOIS.

SAFETY DEVICE FOR VEHICLES.

Application filed January 7, 1922. Serial No. 527,790.

*To all whom it may concern:*

Be it known that I, WILLIAM I. WHEELER, a citizen of the United States, residing at Scottville, in the county of Macoupin and State of Illinois, have invented certain new and useful Improvements in Safety Devices for Vehicles, of which the following is a specification, reference being had to the accompanying drawings.

This invention relates to certain improvements in safety devices for vehicles, and it is primarily an object of the invention to provide a novel and improved device of this general character which will operate effectively to prevent backward movement of the vehicle.

It is also an object of the invention to provide a novel and improved device of this general character especially designed and adapted for use in connection with a motor driven vehicle and which comprises means whereby such vehicle may be held against rearward movement and which is of particular advantage in the event of engine trouble, misshifting of gears, or the like.

Furthermore, it is an object of the invention to provide a novel and improved safety device of this general character having means associated therewith and operable either from the reverse pedal or a separate lever or element to render said means inactive or inoperative.

An additional object of the invention is to provide a novel and improved device of this general character coacting with a rotatable part comprised in the driving means of the vehicle and normally operating to hold said vehicle against rearward movement, said rotatable part being a part of the transmission, an axle, or the like.

Another object of the invention is to provide a novel and improved device of this general character which is adapted for use in connection with a rotary member and which normally operates to hold said member against rotation in one direction, together with means whereby the rotary member may be held or locked against rotation in either direction.

The invention consists in the details of construction and in the combination and arrangement of the several parts of my improved safety device for vehicles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is an elevational view of a transmission mechanism showing a safety device constructed in accordance with an embodiment of my invention applied thereto, portions of the mechanism being diagrammatically indicated by dotted lines;

Figure 2 is an enlarged fragmentary sectional view illustrating in detail certain features of my improved device as herein set forth;

Figure 3 is a view similar to Figure 2 showing the holding member in a second position;

Figure 4 is a fragmentary view partly in section and partly in elevation illustrating in detail a portion of the means for rendering the locking device inoperative;

Figure 5 is a fragmentary view in top plan of a portion of the structure as illustrated in Figure 4;

Figure 6 is a fragmentary view partly in section and partly in elevation illustrating a further embodiment of my invention;

Figure 7 is a sectional view taken through Figure 6;

Figure 8 is a fragmentary sectional view illustrating a safety device constructed in accordance with another embodiment of my invention;

Figure 9 is a sectional view taken substantially on the line 9—9 of Figure 10; and Figure 10 is a sectional view taken substantially on the line 10—10 of Figure 9.

In the embodiment of my invention as disclosed in Figures 1 to 5 of the accompanying drawings, G denotes the sliding gear contained within the housing H. Bolted or otherwise secured to a wall of the housing H is a box B, the adjacent wall of the housing having an opening 1 whereby the box B is in communication with the housing H. Arranged within the box B adjacent the top thereof and supported by the side walls 2 of said box B is a pin 3 which provides a mounting for the member M and whereby said member is capable of swinging movement toward or from the housing H. The housing H and more particularly the member M is positioned adjacent the sliding gear G for a purpose which will be hereinafter clearly understood.

The member M is substantially U-shaped in cross section providing a channel or groove 4 extending entirely along the member M and facing toward the housing H. The upper portion of the member M is provided with an upwardly and rearwardly directed lug or arm 5 which is loosely or freely engaged with the pin 3 so that said member M is supported in desired position and for required movement.

Intersecting the upper portion of the channel or groove 4 and supported by the side walls thereof is a pin 6 which provides a mounting for the holding member or dog D. The member or dog D has its working end toothed, as at 7, said teeth being arcuately arranged and substantially on the same radius as the radius of the gear G so that the member or dog D may engage the teeth of the gear G, permitting unobstructed or unhindered rotation of the gear G in one direction but operating to lock effectively said gear against reverse movement. The teeth 7 are arranged to one side of the mounting 6 so that the dog or member D will swing by gravity in a direction to assure the desired mesh or engagement of the teeth 7 with the gear G. To further assure the gravity or automatic movement of the member or dog D, the same is provided with a depending extension or tail 8.

The gear G normally rotates in the direction of the arrow, as indicated in Figures 2 and 3, and it is to be noted that the lowermost tooth 7ª is shorter than the remaining teeth. The position of this shorter tooth 7ª, while at all times not necessary, is of particular advantage when the gear G is rotating relatively slow in its normal direction. When the gear G is rotating moderately slow, the gravity movement of the member or dog D will cause said member or dog to assume a position whereby the shorter tooth 7ª will be engaged by the teeth of the gear G with a minimum of rocking movement imposed upon the member or dog D. Under these conditions, the shorter tooth 7ª may be said to be constantly in mesh with the gear G and should the gear G be caused to rotate in the reverse direction, the teeth 7 will be caused to interlock with the gear G by action of said gear G in substantially an instantaneous manner.

The inner edge of the dog or member D and the extension or tail 8 thereof from the shorter tooth 7ª is arcuately disposed, as at 9, so that, when the gear G is rotating in its normal direction and the dog or member D thrown into an inoperative position, as indicated by full lines in Figure 3, no obstruction will be offered by said dog or member D or more particularly the extension or tail 8 thereof to such rotation of the gear G. The swinging movement of the dog or member D or more particularly the swinging movement of the upper or working end portion of said dog or member D is limited by contact with the upper portion of the base wall of the groove or channel 4 of the swinging member M. The member M and the parts carried thereby have gravity movement in a direction inwardly of the box B or away from the gear G and the locking device is rendered inoperative by permitting such swinging movement.

The rear face of the member M is provided with a lug 10 which, in the present instance, contacts with a head or block 11 overlying and in slidable contact with a second head or block 12. One of the blocks, as 12, is provided therealong with a groove or channel 14 in which is received the second block 11 whereby said blocks are maintained against displacement. The opposite face of the head or block 12 is also provided therealong with a second groove or channel 15 in which extends the inserted end portion of a shank 16 threaded through the outer wall of the box B, said shank 16 constituting an adjustable stop whereby the extent of swinging movement of the member M inwardly of the housing H or toward the gear G may be regulated to best comply with the requirements of practice. The shank 16 also provides a supporting means for the heads or blocks 11 and 12.

The heads or blocks 11 and 12 are capable of endwise movement one independently of the other and in the present embodiment of my invention, the block 11 is pivotally engaged, as at 17, with an end portion of a rod 18 slidably disposed through a side wall of the box B and operatively engaged, as at 19, with a shifting lever L. Upon requisite movement of the lever L, the head or block 12 is moved in one direction and as the opposite end portions of the blocks 11 and 12 are provided with the complemental cams or bevels 20, upon desired movement of the head or block 12, the second block 11, under the influence of the weight of the member M and the parts carried thereby, will move away from the gear G a distance sufficient to permit the member M to assume a position whereby the teeth 7 and the tooth 7ª will be entirely free from the gear G as shown by dotted lines in Figure 3.

At this time, it is to be stated that the gravity swinging movement of the member or dog D is limited by contact of the extension or tail 8 with the base wall of the groove or channel 4. When it is desired to return the member M to a position to effect the desired engagement of the member or dog D with the gear G, the lever L is moved in a reverse direction.

In the present embodiment of my invention, I also show the head or block 11 operatively engaged, as at 21, with the rod 22, said rod being slidably disposed through a second side wall of the box B. This rod 22 is adapted to be operatively connected with the reverse pedal P so that, when said pedal is operated to effect a reverse in the transmission, the head or block 11 will be moved under the influence of said pedal in a direction to have the required rearward movement as permitted by the bevels or cams 20 so that the member M or more particularly the member or dog D carried thereby may assume an inoperative position.

The transmission disclosed in the present application is of a type wherein the gear G is shifted in one direction for a reverse rotation and in the opposite direction for its neutral position and still further in such direction for its low or first speed. As it is only necessary to normally hold the gear G against rotation in a direction reverse to its normal rotation, the member or dog D or more particularly the working face thereof is of such width, as diagrammatically indicated in Figure 1, to engage the gear G when said gear is either in its neutral or forward position. When the gear G is shifted in position for reverse, it is moved rearwardly and out of engagement with the dog or member D.

In the embodiment of my invention as illustrated in Figures 6 and 7, a gear G' is fixed directly to the driving shaft S and coacting therewith is a member or dog D' supported and operated in substantially the same manner as hereinbefore set forth with respect to the dog or member D.

In the form of my invention as illustrated in Figure 8, the housing H' has secured to a wall thereof the box B', the adjacent wall of the housing H' having an opening 1' whereby the box B' is in communication with the housing H'. Arranged within the box B' and supported by the side walls 2' thereof is a pin 3' which provides a mounting for the member or dog D". The member or dog D" has its working end formed into a toothed segment 7' which engages with the teeth of the sliding gear G" arranged within the housing H'.

The member or dog D" is provided with an extension or tail 8', the inner edge of which is arcuately disposed, as at 9', so that when the gear G" is rotating in its normal direction, the member or dog D" or more particularly the extension or tail 8' thereof will offer no obstruction to such rotation of the gear G". Upon retrograde or reverse rotation of the gear G", the member or dog D" will swing downwardly by gravity to effect the desired mesh between the segmental gear 7' and the gear G", resulting in the tail or extension 8' contacting with the stop member M' whereby said gear G" is effectively locked or held against such reverse rotation.

The member M' is slidably disposed within the box B' and may be manually operated or may be operated from the reverse pedal of an engine or motor or otherwise as the requirements of practice may prefer. The member or dog D" is also provided with an upstanding extension 4' having its inner edge 5' arcuately disposed so that the member or dog D" may be swung downwardly, upon retraction of the member M', to permit the gear G" to have retrograde movement. The member or dog D" may be held in this last position by the member M', it being understood that under these conditions the tail or extension 8' will contact with the member M' from above. When the member or dog D" is in position to permit the retrograde movement of the gear G", the arcuate edge 5' will offer no hindrance or obstruction to such desired rotation.

The extension 4' also provides means whereby the gear G" may be held against rotation in either direction. With the member or dog D" locked against movement in one direction by the member M', as indicated in Figure 8 of the accompanying drawings, it is only necessary to place a second stop member rearwardly of the extension 4'. As disclosed in Figure 8, a stop member X is slidably disposed through a sleeve 6' carried by the box B' and in communication therewith.

When the member X is moved inwardly of the box B', as indicated by dotted lines in Figure 8, to engage behind the extension 4', it is adapted to be locked in such position by a padlock A or other locking device as may be preferred. When the member X is in its inoperative position, it is also adapted to be held in such position by the locking device A. In the present embodiment of my invention, the locking device A includes a shackle 10' which is adapted to be inserted through one of several openings 11' provided in the sleeve 6' and which are adapted to register with an opening 12' in the stop member X.

In the embodiment of my invention as illustrated in Figures 9 and 10, a gear $G^a$ is fixed directly to a driving shaft $S^a$ or other rotating member. Coacting with the gear $G^a$ is a member or dog $D^a$ supported and operated in substantially the same manner as hereinbefore set forth with respect to the dog or member D". Associated with the depending extension or tail $8^a$ of the dog or member $D^a$ is a stop member $M^a$. In order to positively lock or hold the member $M^a$ in desired position, I provide a holding member $X^a$ which is slidably disposed through a sleeve $6^a$ extending from and in communication with the outstanding sleeve $6^b$ through which the member $M^a$ is disposed. The inserted end of the member X^a is reduced, as indicated at x, and which is adapted to engage within a recess or pocket y in the member M^a.

To further hold the gear G^a against rotation, I provide a second stop member Z which is slidably disposed through a sleeve 23 extending outwardly from the housing H^a. The member Z extends within the housing H^a and is provided with a cutaway portion or recess 24 through which the gear G^a freely passes when the member Z is in its inoperative position. Outwardly of the cut-away portion or recess 24, the member Z is provided with a groove or channel 25 which, upon inward movement of the member Z, receives a tooth of the gear G^a whereby the gear G^a is positively locked against rotation in either direction. The member Z may be held in either its operative or inoperative position in the same manner as hereinbefore set forth with respect to the stop member X and for which reason the member Z is provided with a pair of longitudinally spaced openings 26.

With a device constructed in accordance with an embodiment of my invention, it will be at once evident that under normal conditions a motor vehicle will be prevented from accidentally running or drifting rearwardly and which feature is of particular advantage should the car be on a hill or other incline and the motor become dead, the gears be misshifted or from other cause.

It will also be understood that my improved device may be employed with equal advantage in connection with other rotatable elements to normally hold the same against a reverse or retrograde rotation.

From the foregoing description it is thought to be obvious that a safety device for vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. The combination with a rotatable member; of a holding member supported for swinging movement and automatically moving in a direction to engage the rotatable member to hold the same against rotation in one direction, said holding member normally offering no obstruction to the rotation of the rotatable member in the opposite direction, the rotatable member being toothed, the holding member having an arcuate toothed portion in mesh with the rotatable member, the end tooth of the holding member being shorter than the remainder of such teeth.

2. The combination with a rotatable member; of a member supported for swinging movement, a holding member pivotally engaged with the swinging member and automatically moving in a direction to engage the rotatable member to hold the same against rotation in one direction, said holding member offering no obstruction to the rotation of the first named member in the opposite direction, said swinging member automatically moving in a direction away from the rotatable member, and means for moving said swinging member in a direction toward the rotatable member.

3. The combination with a rotatable member; of a member supported for swinging movement, a holding member pivotally engaged with the swinging member and automatically moving in a direction to engage the rotatable member to hold the same against rotation in one direction, said holding member offering no obstruction to the rotation of the first named member in the opposite direction, said swinging member automatically moving in a direction away from the rotatable member, means for moving said swinging member in a direction toward the rotatable member, and means for limiting the movement of the swinging member away from the rotatable member.

4. The combination with a rotatable member; of a member supported for swinging movement, a holding member pivotally engaged with the swinging member and automatically moving in a direction to engage the rotatable member to hold the same against rotation in one direction, said holding member offering no obstruction to the rotation of the first named member in the opposite direction, a movable member with which the swinging member constantly contacts, and means for moving said movable member, said movable member being provided with a cam so that upon movement in one direction, the movable member may move in a direction away from the rotatable member.

5. The combination with a rotatable member; of a member supported for swinging movement, and a holding member pivotally engaged with the swinging member and automatically moving in a direction to cause a portion thereof to one side of its pivot to engage the rotatable member to hold the same against rotation in one direction, said holding member offering no obstruction to the rotation of the first named member in the opposite direction, said holding member being provided at the opposite side of its pivot with an extension to facilitate the swinging movement of said holding member toward the rotatable member.

6. The combination with a rotatable member; of a member supported for swinging movement, and a holding member pivotally engaged with the swinging member and automatically moving in a direction to engage the rotatable member to hold the same against rotation in one direction, said holding member offering no obstruction to the rotation of the first named member in the opposite direction, said holding member being provided with an extension to facilitate the swinging movement of said holding member toward the rotatable member, the movement of the holding member toward the rotatable member being limited by contact of said extension with the swinging member.

7. The combination with a rotatable member; of a member supported for swinging movement, and a holding member pivotally engaged with the swinging member and automatically moving in a direction to engage the rotatable member to hold the same against rotation in one direction, said holding member offering no obstruction to the rotation of the first named member in the opposite direction, the rotatable member being toothed and the coacting portion of the holding member being also toothed to mesh with the rotatable member, an end tooth of the holding member being shorter than the remainder of the teeth of said holding member.

8. The combination with a rotatable member; of a holding member supported for swinging movement and automatically moving in a direction to engage the rotatable member to hold the same against rotation in one direction, said holding member normally offering no obstruction to the rotation of the rotatable member in the opposite direction, the holding member being provided with an extension, the movement of the holding member away from the rotatable member being limited by contact of the extension with the rotatable member, the rotatable member being toothed, the holding member having an arcuate toothed portion in mesh with the rotatable member.

9. The combination with a rotatable member; of a holding member supported for swinging movement and automatically moving in a direction to engage the rotatable member to hold the same against rotation in one direction, said holding member normally offering no obstruction to the rotation of the rotatable member in the opposite direction, the holding member being provided with an extension, the movement of the holding member away from the rotatable member being limited by contact of the extension with the rotatable member, the rotatable member being toothed, the holding member having an arcuate toothed portion in mesh with the rotatable member, and means coacting with said extension for maintaining the teeth of the holding member and of the rotatable member in mesh for locking the rotatable member against rotation in one direction.

10. The combination with a rotatable member, of a holding member supported for swinging movement and automatically moving in a direction to engage the rotatable member to hold the same against rotation in one direction, said holding member normally offering no obstruction to the rotation of the first member in the opposite direction, and means coacting with the opposite end portions of the holding member to limit the swinging movement thereof in either direction.

11. The combination with a rotatable member; of a holding member pivotally supported for swinging movement and automatically moving in a direction to cause a portion thereof to one side of its pivot to engage the rotatable member to hold the same against rotation in one direction, said holding member normally offering no obstruction to the rotation of the rotatable member in the opposite direction, said holding member being provided at the opposite side of its pivot with an extension to facilitate the swinging movement of said holding member toward the rotatable member.

In testimony whereof I hereunto affix my signature.

WILLIAM ISIAH WHEELER.